(No Model.)  F. W. ALLCHIN  6 Sheets—Sheet 3.
ROUNDABOUT.

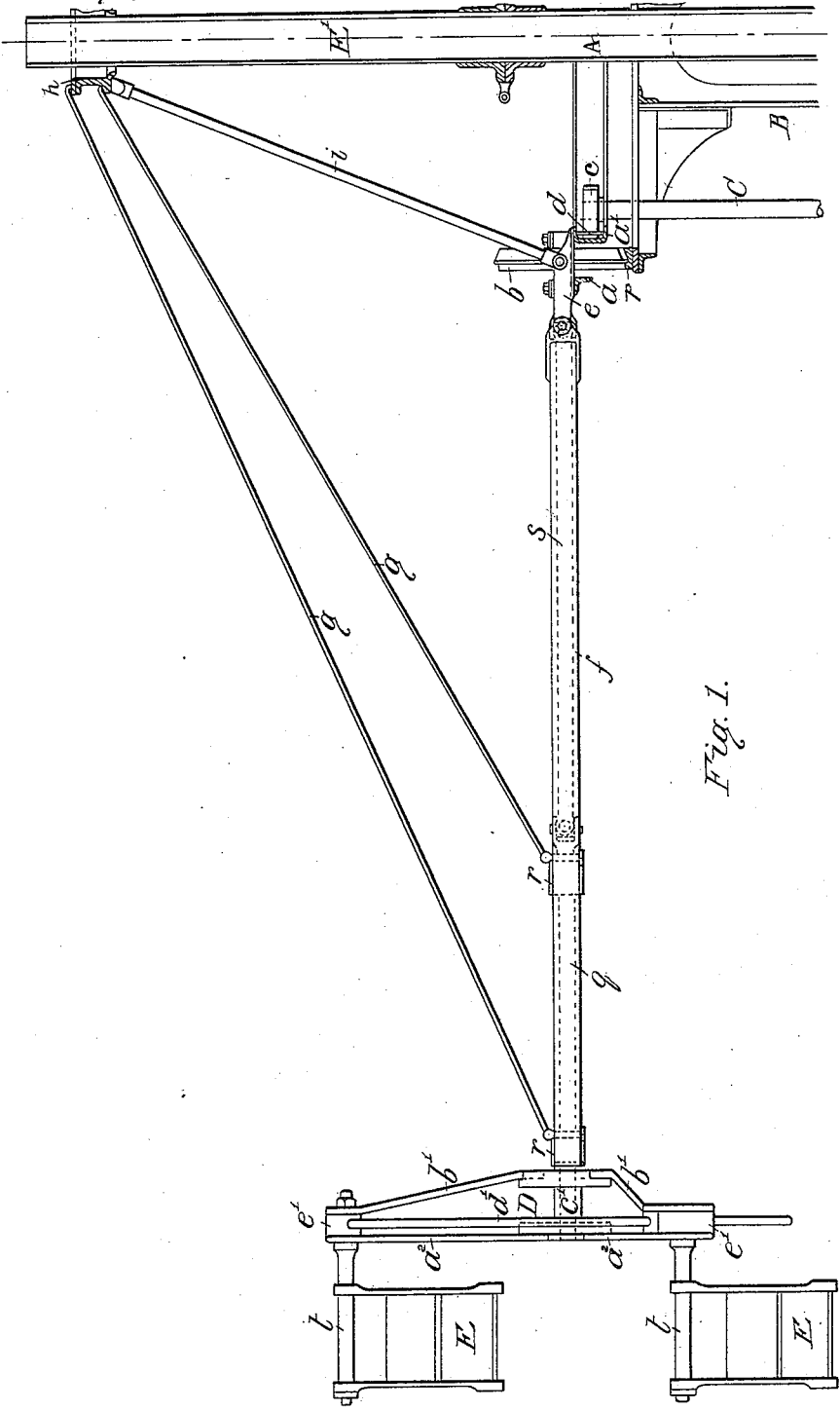

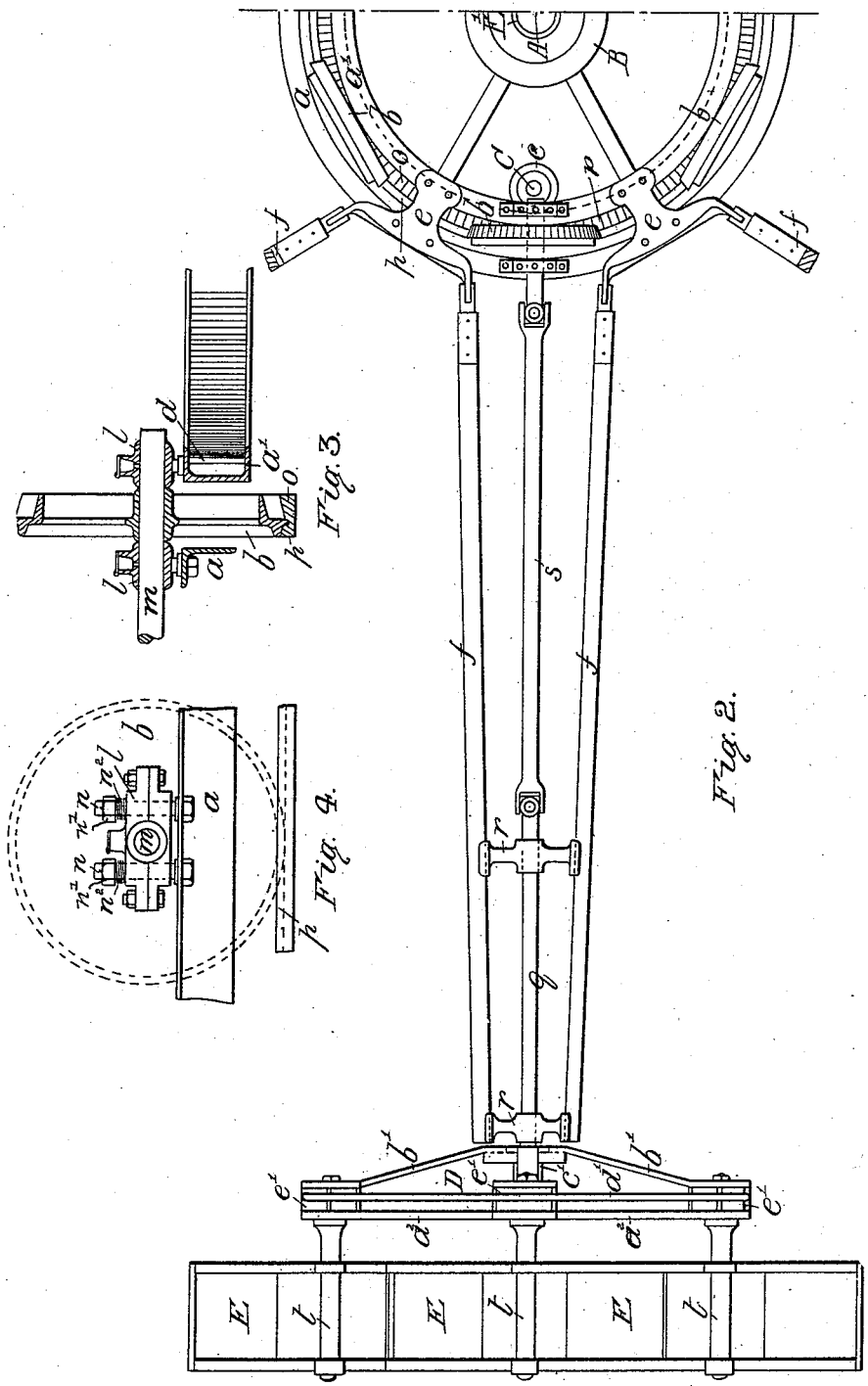

No. 420,758.  Patented Feb. 4, 1890.

Witnesses:
J. E. Criswell.
John Becker

Inventor:
Frank William Allchin,
By his Attorneys,
Arthur C. Fraser & Co.

(No Model.) 6 Sheets—Sheet 4.

F. W. ALLCHIN.
ROUNDABOUT.

No. 420,758. Patented Feb. 4, 1890.

Witnesses:
J. A. C. Criswell.
John Becker

Inventor:
Frank William Allchin,
By his Attorneys,
Arthur C. Fraser & Co.

(No Model.) 6 Sheets—Sheet 5.

F. W. ALLCHIN.
ROUNDABOUT.

No. 420,758. Patented Feb. 4, 1890.

Witnesses:
J.A.E.Criswell.
John Becker

Inventor:
Frank William Allchin,
By his Attorneys,
Arthur E. Fraser &Co.

(No Model.)  
6 Sheets—Sheet 6.

F. W. ALLCHIN.
ROUNDABOUT.

No. 420,758.  Patented Feb. 4, 1890.

Witnesses:
J. W. Criswell
John Becker

Inventor:
Frank William Allchin,
By his Attorneys,
Arthur C. Fraser & Co

UNITED STATES PATENT OFFICE.

FRANK WILLIAM ALLCHIN, OF NORTHAMPTON, COUNTY OF NORTHAMPTON, ENGLAND.

ROUNDABOUT.

SPECIFICATION forming part of Letters Patent No. 420,758, dated February 4, 1890.

Application filed October 4, 1888. Serial No. 287,170. (No model.)

*To all whom it may concern:*

Be it known that I, FRANK WILLIAM ALLCHIN, engineer, a subject of the Queen of Great Britain, residing at Northampton, in the county of Northampton, England, have invented certain new and useful Improvements in or relating to Roundabouts or Merry-go-Rounds and other Riding Toys, of which the following is a specification.

The invention is illustrated in the accompanying drawings, in which—

Figure 5:
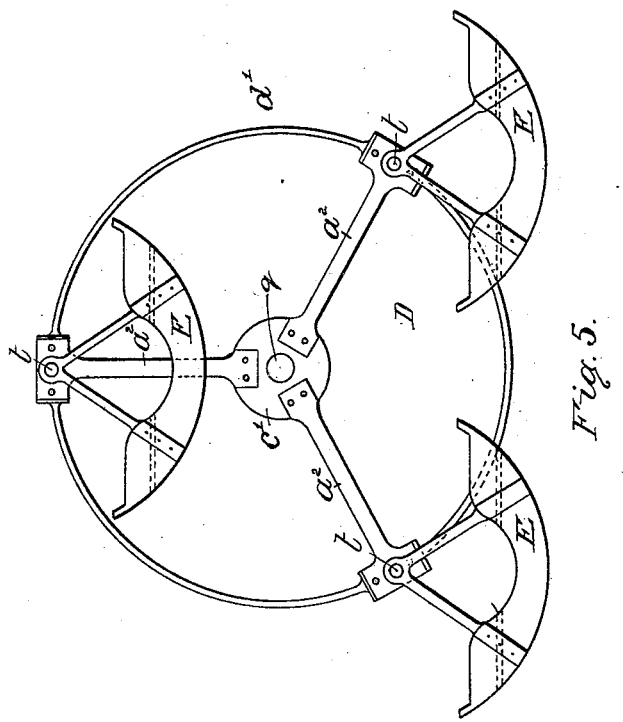
Figure 6:
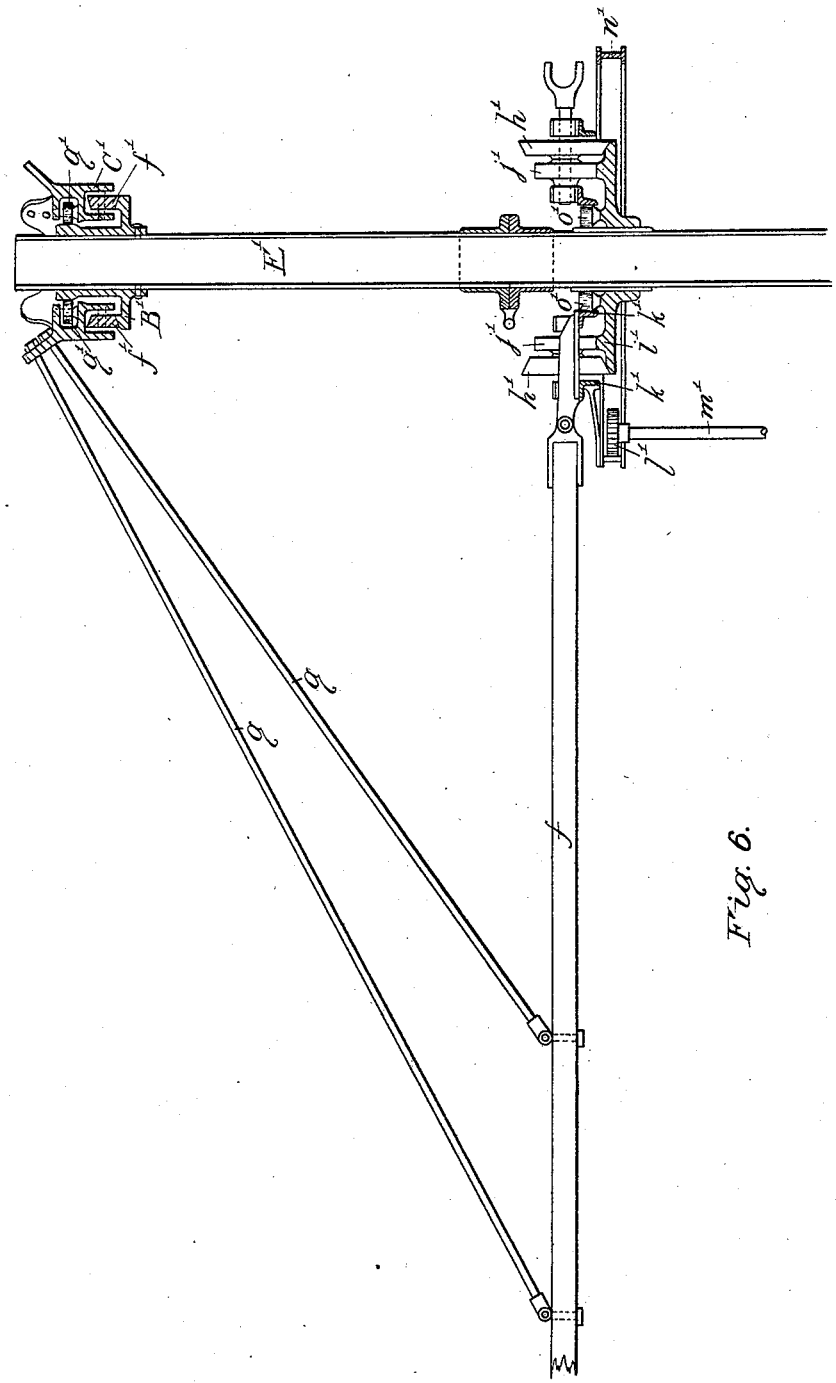
Figure 7:
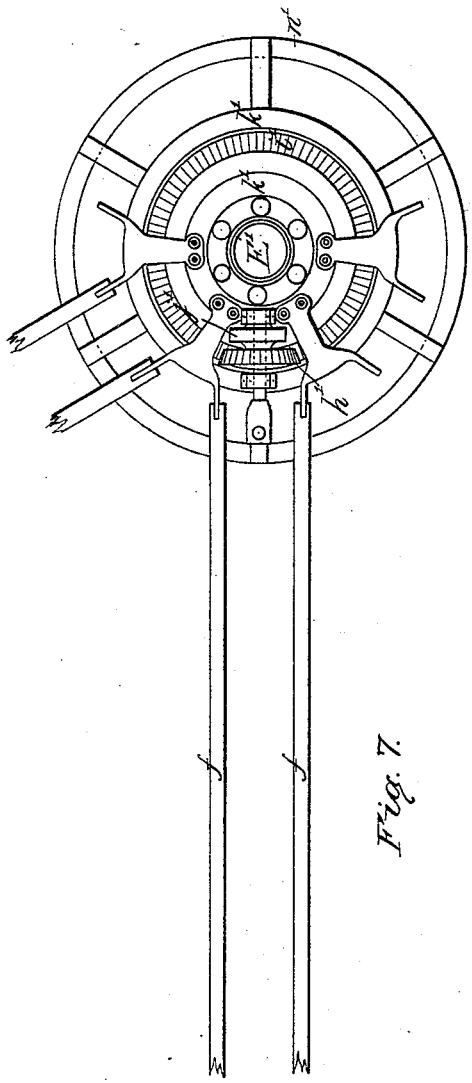
Figure 8:
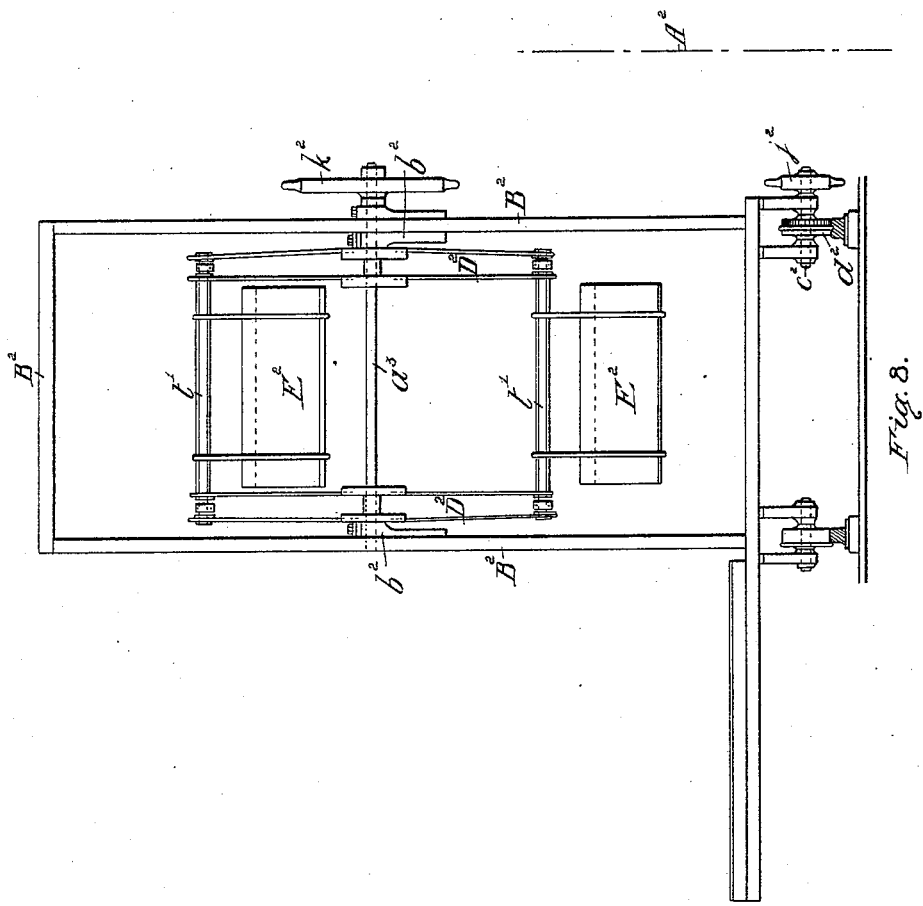

Figure 1 is a vertical section of the upper part of a roundabout constructed in accordance with the present improvements, one-half only of the roundabout being shown. Fig. 2 is a plan view of the parts shown in Fig. 1. Figs. 3 and 4 are detail views of parts of the mechanism. Fig. 5 is an end view of one of the radially-extending arms; and Figs. 6, 7, and 8 are views of modifications.

The parts of the machine which revolve around the central axis A are carried upon a frame $a$ $a'$, formed of a ring of angle-iron $a$, and a ring of channel-iron $a'$. This frame is mounted upon wheels $b$, which run upon a circular track $p$, carried upon a central pedestal B, and the frame is driven round by means of a pinion $c$, gearing into a lantern-wheel formed by fixing a number of vertical bars $d$ to the inwardly-projecting flanges of the channel-iron $a'$. The pinion $c$ is mounted upon the upper end of a vertical spindle C, which is itself driven by the aid of a portable engine, as is usual with this class of machines, or by other convenient means. The rings $a$ and $a'$ are joined together at intervals by brackets $e$, to which are hinged or pivoted radiating pairs of spars $f$ $f$, the outer ends of which are supported, by means of tie-rods $g$ $g$, from a central ring $h$, which is itself supported, by means of struts $i$, from the brackets $e$, before described. The rods $g$ $g$, ring $h$, and struts $i$ are omitted from Fig. 2 for convenience of illustration. It will thus be seen that the entire weight of the parts which revolve around the vertical axis of the machine is carried by the wheels $b$. No novelty is claimed for this method of carrying the parts of the apparatus which revolve around the central axis A, nor for the method of causing them to revolve in such manner. The means by which the frame $a$ $a'$ is mounted on the wheels $b$ is shown, in respect of one of the wheels, to an enlarged scale by Figs. 3 and 4, of which Fig. 3 is a transverse section through one side of the framing, and Fig. 4 an end elevation of Fig. 3. A bearing-block $l$—one on each side of the wheel $b$—is bolted together in halves around the wheel-axle $m$, and bolts or studs $n$, fixed to the framing, pass up through the blocks $l$, and are fitted at their tops with nuts and washers $n'$ $n'$, so that the weight of the framing and the parts which it carries is brought upon the blocks, and consequently upon the wheels $b$. Springs $n^2$ $n^2$ are interposed between the upper block $l$ and the nuts or washers $n'$ $n'$, so that a yielding connection is supplied between the wheels $b$ $b$ and the framing, so as to ease any shocks to which the framing might be subjected. Each wheel $b$ is formed as a spur or toothed wheel on its inner side, and such part gears with a toothed ring $o$, formed, preferably, in a piece with the circular path $p$, as shown in section by Fig. 3. The part of each wheel $b$ which bears upon the circular track $p$ is formed as a flange, as shown.

Referring again to Figs. 1 and 2, a spindle $q$ is mounted in bearings $r$ $r$, forming distance-pieces, which join together a pair of spars $f$ $f$, one of such spindles being mounted between the spars of each pair. The inner end of this spindle $q$ is connected with the outer end of the corresponding axle of a wheel $b$ by means of a rod or bar $s$, having universal-joint connections with the spindle $q$ and wheel-axle, respectively. On the outer end of each spindle $q$ is carried a frame or set of arms D, from which project horizontal pins or axes $t$, and from each pin $t$ is suspended, so as to be capable of swinging freely backward and forward (in order that it may constantly hang down properly during the revolution of the frame D around its own axis) a swing boat or car E or corresponding part, by which a person or persons may be carried.

A front elevation of the set of arms D with the boats suspended from the pins $t$ is shown by Fig. 5. Referring now to this figure, in addition to Figs. 1 and 2 already described, it may be explained that the set of arms D is formed of three outer arms $a^2$ and three inner or back arms $b'$, all fixed to a central hub $c'$ and having their outer ends properly distanced apart circumferentially by means of a tubular or other ring $d'$, fixed in segments to blocks $e'$, forming distance-pieces between the outer ends of the outer and inner arms. It will now be seen that as the framing $a$ $a'$ is driven around the central axis of the machine the sets of arms D will be carried around with the other parts of the machine which revolve around the central axis, and that the spindles $q$ will be caused to revolve on their own axes by the toothed wheels $b$ running in the toothed ring $o$, and thus the sets of arms will be revolved in vertical planes—that is, around their own axes—and therefore give a corresponding movement to the boats or cars E or corresponding parts, in addition to their revolution in a horizontal plane around the central axis A of the machine. The chimney $E'$ of the engine which drives the machine is shown, as is usual, with roundabouts passing up the vertical axis of the machine.

A modification of the means of supporting and driving the parts which revolve around the central axis A of the machine is shown by Figs. 6 and 7, which correspond, respectively, to Figs. 1 and 2; but the outer ends of the spars, together with the sets of arms and boats or cars or corresponding parts, are omitted, as they are the same as in the previously-described modification. In this modification the weights of the outer ends of the spars and of the parts which they carry at their outer ends are supported upon a ring $B'$, fixed around the chimney by means of a revolving ring $C'$, mounted upon rollers $f'$, running upon a circular path formed upon the ring $B'$ and maintained in a proper central position around the chimney by rollers $g'$, running around a turned part around the ring $B'$. The tie-rods $g$ for supporting the outer ends of the spars $f$ have their upper ends fixed to a flange or ears formed out from the ring $C'$, as shown. The rings $B'$ and $C'$ and the parts which they carry are omitted from Fig. 7 for convenience. The spindles which give the rotation on their own axes to the sets of arms which carry the boats, cars, or corresponding parts are caused to revolve by means of bevel-wheels $h'$, running around a spur-ring carried upon a plate or frame $i'$, fixed to the chimney $E'$ or upon a central pedestal, and the spur-wheels $h'$ are properly maintained in their position in relation to the spur-ring by means of rollers $j'$, mounted loosely upon the axles on which the spur-wheels are fixed and running upon a circular path upon the plate $i'$. These axles carry a frame formed of two angle-iron rings $k'$ $k'$. This frame is driven by means of a pinion $l'$ on a vertical shaft $m'$, gearing into a lantern-wheel $n'$, which is fixed by suitable stays or brackets to the outer ring $k'$ of the frame. The frame $k'$ $k'$ is kept in proper central position by means of rollers $o'$, interposed between a sleeve fixed around the chimney $E'$ and the inside of the inner ring $k'$.

In both the modifications above described it will be obvious that the boats, cars, or corresponding parts, operating substantially as described, may be employed in combination with horses, boats, or corresponding parts carried, or carried and operated, in any manner usual with roundabouts or in analogous manner.

A further modification of this invention is shown by Fig. 8. In this figure $A^2$ represents the central axis of a roundabout, and on each side of such axis is mounted upon the revolving framing of the machine a vertical framing $B^2$ $B^2$ $B^2$, which carries a horizontal axle $a^3$. Near each end of such horizontal axle, and within the bearings $b^2$, by which it is carried, are mounted sets of arms $D^2$, corresponding to the sets of arms D shown by Figs. 1 and 2. Horizontal pins or axes $t'$ join together the outer ends of the corresponding arms of each set, as shown, and from these pins or axes are suspended boats or cars $E^2$ or corresponding parts for carrying riders. The axle $a^3$ is driven by chain-gearing from an axle $c^2$, on which is mounted a flanged wheel $d^2$, which runs on a circular rail bedded upon a sleeper, one side of such wheel being formed as a spur-pinion, which gears into a spur-ring formed with or fixed to the circular rail. The chain wheel passes around a pinion $j^2$ on the axle $c^2$ and around a wheel $k^2$ on the axle $a^3$. In this modification of the invention a set of swing-boat apparatus corresponding to that shown may be arranged on each side of the central axis of the machine, or one of such apparatus may be arranged over the center of the machine, the vertical axis of the apparatus corresponding with the vertical axis of the roundabout, and in either of these cases a platform which revolves, together with the swing-boat apparatus taken as a whole around the vertical axis of the machine, may be carried around the central swing-boat apparatus, or around the outside of the two sets of apparatus, as the case may be, and horses, boats, or other parts for carrying riders may be carried upon such platform and be operated in any manner now usual, or in other convenient manner. If desired, however, several sets of swing-boat apparatus may be arranged upon a revolving platform, providing they are arranged a sufficient distance from the vertical axis of the machine to allow space for their proper arrangement and working.

According to a further modification of this invention the arms carrying the swing-boats or corresponding parts may be mounted to turn loosely on their spindles, and may be caused to revolve as they are carried around the vertical axis of the roundabout by means of wheels fixed to the arms, or to sleeves or bosses from which the arms radiate and bearing on an elevated circular track, and to insure that no slipping of the wheels on the track shall take place teeth may be formed around the wheels to gear into a circular toothed rack.

The roundabouts, in connection with which the swing-boats, cars, or corresponding parts aforesaid are used, may, of course, be driven in any convenient manner—for instance, by a central engine, (when there is space therefor,) or by an engine outside the roundabout, or by an electromotor.

In roundabouts having revolving platforms it is usual to divide the platform into segments for convenience of conveyance from place to place, and when a platform-machine carrying swing-boat apparatus of the character shown by Fig. 8 is employed, or of similar character, each division may carry one of such apparatus and be so constructed that it may be employed independently as a truck or trolley carrying riders in the swing-boats, the arms which carry the boats being caused to revolve by chain-gearing from an axle of a wheel which runs upon the ground or upon a rail.

Having fully described my invention, what I desire to claim and secure by Letters Patent is—

1. In a roundabout, radially-extending arms rotating in a horizontal plane, a stationary circular track concentric with the center around which said radial arms turn, a horizontal shaft journaled in and carried with said radial arms, and a wheel carried by said shaft and engaging with said track, whereby the rotation of said radial arms carries said wheel around said track and so causes the rotation of said shaft, in combination with a frame carried on the outer end of said shaft, said frame rotating in a vertical plane, and devices for carrying riders carried by said frame, substantially as set forth.

2. In a roundabout, radially-extending arms rotating in a horizontal plane, a stationary circular track concentric with the center around which said radial arms turn, a horizontal shaft journaled in and carried with said radial arms, and a wheel carried by said shaft and engaging with said track, whereby the rotation of said radial arms carries said wheel around said track and so causes the rotation of said shaft, in combination with a frame carried on the outer end of said shaft, said frame rotating in a vertical plane, horizontally-extending spindles on said frame, and devices for carrying riders freely suspended on said spindles, substantially as set forth.

In witness whereof I have hereunto signed my name in the presence of two subscribing witnesses.

FRANK WILLIAM ALLCHIN.

Witnesses:
JNO. D. DOUGLAS,
JOSEPH H. NOLAN,
*Clerks to Messrs. Andrew & Smith, Notaries, Northampton, England.*